(12) United States Patent
Ratiney et al.

(10) Patent No.: US 9,907,043 B2
(45) Date of Patent: Feb. 27, 2018

(54) METHOD FOR SYNCHRONIZING SIGNALS IN A TERRESTRIAL AND SATELLITE LINK AND ASSOCIATED ARCHITECTURE

(71) Applicant: THALES, Courbevoie (FR)

(72) Inventors: Marc Ratiney, Toulouse (FR); Nicolas Van Wambeke, Toulouse (FR); Benjamin Gadat, Toulouse (FR)

(73) Assignee: Thales, Courbevoie (FR)

( * ) Notice: Subject to any disclaimer, the term of this patent is extended or adjusted under 35 U.S.C. 154(b) by 144 days.

(21) Appl. No.: 14/975,184

(22) Filed: Dec. 18, 2015

(65) Prior Publication Data

US 2016/0183213 A1 Jun. 23, 2016

(30) Foreign Application Priority Data

Dec. 23, 2014 (FR) .................................... 14 02969

(51) Int. Cl.
| | | |
|---|---|---|
| *H04W 56/00* | (2009.01) | |
| *H04B 7/02* | (2017.01) | |
| *H04H 20/18* | (2008.01) | |
| *H04H 20/24* | (2008.01) | |
| *H04B 7/26* | (2006.01) | |
| *H04B 7/185* | (2006.01) | |
| *H04B 7/024* | (2017.01) | |

(Continued)

(52) U.S. Cl.
CPC ........ *H04W 56/0065* (2013.01); *H04B 7/022* (2013.01); *H04B 7/024* (2013.01); *H04B 7/026* (2013.01); *H04B 7/18517* (2013.01); *H04B 7/2684* (2013.01); *H04B 7/2696* (2013.01); *H04H 20/18* (2013.01); *H04H 20/24* (2013.01); *H04W 56/0005* (2013.01); *H04W 56/009* (2013.01); *H04W 56/0045* (2013.01)

(58) Field of Classification Search
CPC .......... H04W 56/0065; H04W 56/009; H04W 56/0005; H04W 56/0045; H04H 20/24; H04H 20/18; H04B 7/2696; H04B 7/2684; H04B 7/18517; H04B 7/024; H04B 7/022; H04B 7/026
See application file for complete search history.

(56) References Cited

U.S. PATENT DOCUMENTS

2003/0122705 A1 7/2003 Marko et al.
2009/0116543 A1 5/2009 Schiff et al.
(Continued)

FOREIGN PATENT DOCUMENTS

| EP | 0 845 874 A2 | 6/1998 |
|---|---|---|
| EP | 1 819 067 A1 | 8/2007 |
| WO | 98/09390 A1 | 3/1998 |

*Primary Examiner* — Kwang B Yao
*Assistant Examiner* — Moo Ryong Jeong
(74) *Attorney, Agent, or Firm* — Baker Hostetler LLP

(57) ABSTRACT

A method for synchronizing the transmission of messages in a communication system comprises a user terminal, a main communication network comprising a first station, and a secondary communication network comprising a second station, the method consisting of an exchange of synchronization signals to calculate an offset to be applied to the instant of emission of the messages transmitted by the second station so that the messages transmitted by the first station and the second station are received by the user terminal in a synchronous manner. A communication system implementing the invention is provided.

9 Claims, 7 Drawing Sheets

(51) Int. Cl.
    *H04B 7/022*        (2017.01)
    *H04B 7/026*        (2017.01)

(56)            References Cited

U.S. PATENT DOCUMENTS

2009/0232113  A1*   9/2009   Tamaki  ............. H04W 56/0045
                                                        370/337
2012/0258706  A1*  10/2012   Yu  ..................... H04W 56/0045
                                                        455/426.1
2015/0289219  A1*  10/2015   Kim  .................. H04W 56/0015
                                                        370/350

* cited by examiner

METHOD FOR SYNCHRONIZING SIGNALS IN A TERRESTRIAL AND SATELLITE LINK AND ASSOCIATED ARCHITECTURE

CROSS-REFERENCE TO RELATED APPLICATION

This application claims priority to foreign French patent application No. FR 1402969, filed on Dec. 23, 2014, the disclosure of which is incorporated by reference in its entirety.

FIELD OF THE INVENTION

The invention lies in the field of telecommunications, and more particularly in the field of telecommunications systems dedicated to the control and command of drones.

It is aimed at proposing a method making it possible to synchronize the instants of arrival of communications originating from a satellite network and from a terrestrial wireless network and bound for a user terminal.

The invention describes the architecture of a satellite/terrestrial hybrid transmission system implementing the method.

BACKGROUND

The insertion of unmanned aircraft, or drones, into the airspace is currently limited to appropriate, so-called "segregated", spaces so as to limit the risks of incidents. Segregated spaces are reserved spaces, often military, which are subject to specific rules, and into which civil equipment, such as civil or commercial aviation aircraft, do not enter.

The opening up of non-segregated airspace to drones poses numerous technological problems, such as that of the reliability of anticollision mechanisms, or that of the reliability of the telecommunication systems used for control and command. The telecommunication systems used will therefore have to meet strict criteria in terms of performance (packet error rates, latency of the network, useful bitrate, continuity and availability of service).

In order to meet these heavy requirements, it is possible for the communication means to be made redundant, by using for example a satellite main network and a terrestrial secondary network.

Two strategies for managing the redundancy of the communication means are then possible.

The first strategy consists in transmitting via a single main network and in switching the communications over to a secondary network in case of failure. This solution requires the detection of the failure of the main network, and the re-establishment of the current communications on the secondary network.

The drawback of such a solution is that the system is unavailable during the failure detection time and during the time for re-establishment of the communication via the secondary network. The availability of the system is therefore degraded. Depending on the duration of service interruption, the failure can be considered to be a loss-of-service-continuity event.

Moreover, depending on the redundancy mechanism implemented, the packets currently being transmitted via the main network may be lost and will have to be retransmitted by the secondary network. The failure will therefore lead to more considerable transmission latency. The latency jitter will therefore also be more considerable.

Finally, depending on the redundancy mechanism chosen, the re-establishment of the communications on the secondary network may require protocol exchanges with the terminals. In this case the re-establishment of the communications is not transparent to the users. As all the users of the main network are impacted by the failure, the communications re-establishment mechanism will cause a spike in usage of the network in respect of the protocol exchanges. Depending on the dimensioning of the system, this spike may give rise to a choking of the system and in all cases will lead to a more considerable latency.

This strategy is therefore not suitable for the control and command of drones.

The second strategy consists in transmitting the traffic in parallel via the two networks, and in deleting the duplicate blocks on reception. The advantage of such a solution is that in case of failure of one of the networks, the communication is not interrupted and continues via the available network. Service availability and service continuity are therefore not impacted by the failure of one of the networks. The failure of a network is transparent to the users and does not require any protocol exchanges.

The drawback of this second solution is that in nominal mode it requires twice as much bandwidth over the air and in the networks.

So as to limit the occupancy of the bandwidth, and to reduce the cost of the equipment, it is known to use the same frequencies to communicate with the satellite network and the terrestrial network.

The document "Hybrid Satellite/Terrestrial Cooperative Relaying Stategies for DVB-SH based Communication Systems" proposes using the DVB-SH (Digital Video Broadcasting-Satellite Handheld) standard in a hybrid system composed of a satellite network, and of one or more terrestrial networks responsible for relaying, on the same frequency, the message transmitted by the satellite network.

The DVB-SH standard uses a waveform of OFDM (Orthogonal Frequency-Divison Multiplexing) type associated with turbo codes and with an MRC (Maximum Radio Combining) mechanism so as to recombine the signals at the level of the user terminal.

The signal transmitted from the terrestrial network is delayed with respect to the signal transmitted from the satellite network. The use of OFDM modulation makes it possible to compensate for the transmission delays, and to recombine the two signals.

However, this mechanism is not suitable for access modes requiring accurate synchronization between the signals, such as TDMA (Time Division Multiple Access), or WCDMA (Wideband Code Division Multiple Access).

Moreover, the delay between the signal transmitted by the satellite network and the signal transmitted by the terrestrial network may moreover be considerable. This delay is compatible with the use of OFDM modulation, but not necessarily with waveforms having more limited possibilities for compensating for delays, such as waveforms with temporal equalizer, or spread waveforms associated with Rake receivers.

The compatibility of a satellite/terrestrial hybrid communication system with access modes of TDMA or WCDMA type, or the use of modulations other than OFDM modulations, therefore requires the synchronization of all of the networks used, in such a way that the messages transmitted by the terrestrial network and the satellite network arrive in a synchronous manner at the user terminal.

The GSM (Global System for Mobile Communications) standard proposes a mechanism for synchronization in a network comprising a base station and a plurality of users. For this, a time shift that has to be applied by each of the user terminals is calculated by the base station, in such a way that the transmitted signals are synchronized when they reach the base station.

However, such operation is incompatible upon the addition of a second network, since this would make it necessary to apply two different time shifts at the level of the user terminals.

Likewise, implementing such a synchronization mechanism at the level of a user terminal would exclude the implementation of several user terminals in the same network.

SUMMARY OF THE INVENTION

The invention therefore consists in proposing a synchronization method making it possible to slave all of the temporal references of the equipment of a communications network to that of the satellite station, and making it possible to calculate an offset to be applied to the transmissions from the terrestrial station. The aim of the method consists in that the signals originating from the satellite station and from the terrestrial station reach the user terminal in a synchronous manner.

Thus, the implementation of the method allows the simultaneous use of the satellite link and of the terrestrial link, in a communications system using access modes of TDMA or WCDMA type, or transmitting simultaneously on the two links by using waveforms having lesser capabilities for tolerating propagation delays than those of OFDM.

The invention applies to communication systems comprising a terrestrial link and a satellite link bound for an aircraft or for a drone, but can also apply to any type of communication requiring the synchronization of the instant of arrival of messages originating from two or more communication networks.

The invention therefore consists of a method for synchronizing the transmission of messages in a communication system comprising a user terminal, a main communication network to the said user terminal comprising a first station, and a secondary communication network to the said user terminal comprising a second station, intended to be executed on the said first station comprising a temporal reference. The method is characterized in that it comprises the steps of:
1) emission of a first synchronization signal to the said user terminal and the said second station,
2) measurement of the instant of reception of a second synchronization signal emitted by the user terminal subsequent to the reception of the said first synchronization signal, and of a third synchronization signal emitted by the second station subsequent to the reception of the said first synchronization signal, and calculation of a first time interval on the basis of these reception instants,
3) transmission of the said first calculated time interval to the said second station, and
4) emission of a fourth synchronization signal to the said second station.

The invention also consists of a method for synchronizing the transmission of messages in a communication system comprising a user terminal, a main communication network to the said user terminal comprising a first station, and a secondary communication network to the said user terminal comprising a second station, intended to be executed on the said second station comprising a temporal reference, characterized in that it comprises the steps of:
a) measurement of the instant of reception of a first synchronization signal emitted by the said first station,
b) adjustment of the said temporal reference with respect to the instant of reception of the said first synchronization signal,
c) emission of a second synchronization signal to the said first station,
d) reception of a first time interval transmitted by the said first station,
e) measurement of the instant of reception of a third synchronization signal emitted by the said first station and of the instant of reception of a fourth synchronization signal emitted by the said user terminal, and calculation of a second time interval on the basis of these reception instants,
f) calculation of a third time interval on the basis of the said first time interval and of the said second time interval, and
g) upon the emission of data by the second station bound for the user terminal, shifting of the instants of emission by a duration equal to the third time interval.

The invention also consists of a method for synchronizing the transmission of messages in a communication system comprising a user terminal, a main communication network to the said user terminal comprising a first station, and a secondary communication network to the said user terminal comprising a second station, intended to be executed on the said user terminal comprising a temporal reference, characterized in that it comprises the steps of:
I) measurement of the instant of reception of a first synchronization signal emitted by the said first station,
II) adjustment of the said temporal reference with respect to the instant of reception of the said first synchronization signal,
III) emission of a second synchronization signal to the said first station, and
IV) emission of a third synchronization signal to the said second station.

The invention also consists of a general method for synchronizing the transmission of messages in a communication system comprising a user terminal, a main communication network to the said user terminal comprising a first station, and a secondary communication network to the said user terminal comprising a second station, the said first station, second user station and terminal each comprising a temporal reference, the said method being characterized in that it comprises the steps of:
emission, by the said first station, of a first synchronization signal to the said second station and the said user terminal,
measurement, by the said second station and the said user terminal, of the instants of reception of the said first synchronization signal,
adjustment of the temporal references of the said second station and of the said user terminal, on the basis of the instants of reception of the said first synchronization signal,
emission, by the said user terminal, of a second synchronization signal to the said first station,
emission, by the said second station, of a third synchronization signal to the said first station,
measurement, by the said first station, of the instant of reception of the said second synchronization signal and of the instant of reception of the said third synchronization signal, and calculation of a first time interval on the basis of these reception instants, transmission, by the said first station, of the said first calculated time interval to the said second station, emission, by the said first station, of a fourth synchronization signal to the said second station, emission, by the said user terminal, of a fifth synchronization signal to the said second station, measurement, by the said second station, of the instant of reception of the said fourth synchronization signal and of the instant of reception of the said fifth synchronization signal, and calculation of a second time interval on the basis of these reception instants, calculation, by the said second station, of a third time interval on the basis of the said first time interval and of the said second time interval, and upon the emission of data by the second station bound for the user terminal, shifting of the instants of emission by a duration equal to the third time interval.

Advantageously, the said fourth and fifth synchronization signals are transmitted in one and the same time slot, the said time slot designating an instant of emission with respect to the temporal reference.

Advantageously, the said first time interval represents a difference between the time of transmission of the user terminal to the first station and the time of transmission of the second station to the first station.

Advantageously, the said second time interval represents a difference between the instant of arrival of the said fourth synchronization signal transmitted by the said first station and the instant of arrival of the said fifth synchronization signal transmitted by the said user terminal.

Advantageously, the said third time interval represents a time shift to be applied in respect of the emissions of the second station, the said time interval being obtained by summation between the said first time interval and the said second time interval.

Advantageously, the said user terminal, the said first station, and the said second station transmit the said synchronization signals on different emission frequencies.

Advantageously, the said synchronization signals comprise an emission time.

Advantageously, the communication networks are suitable for implementing a TDMA waveform.

The invention also consists of a communication system comprising a user terminal, a main communication network to the said user terminal comprising a first station, and a secondary communication network to the said user terminal comprising a second station, characterized in that the said first station, the said second station, and the said user terminal are configured to implement the above-described method for synchronizing the transmission of messages.

Advantageously, the communication system furthermore comprises a multi-link gateway responsible for dispatching data to the said first station and the said second station.

Advantageously, the said first time interval is transmitted by the said first station to the said second station by way of the multi-link gateway.

Advantageously, the main communication network is a satellite network and the secondary communication network is a terrestrial network.

BRIEF DESCRIPTION OF THE DRAWINGS

The invention will be better understood and other characteristics and advantages will be better apparent on reading the nonlimiting description which follows, and by virtue of the appended figures among which.

DETAILED DESCRIPTION

Figure 1A:
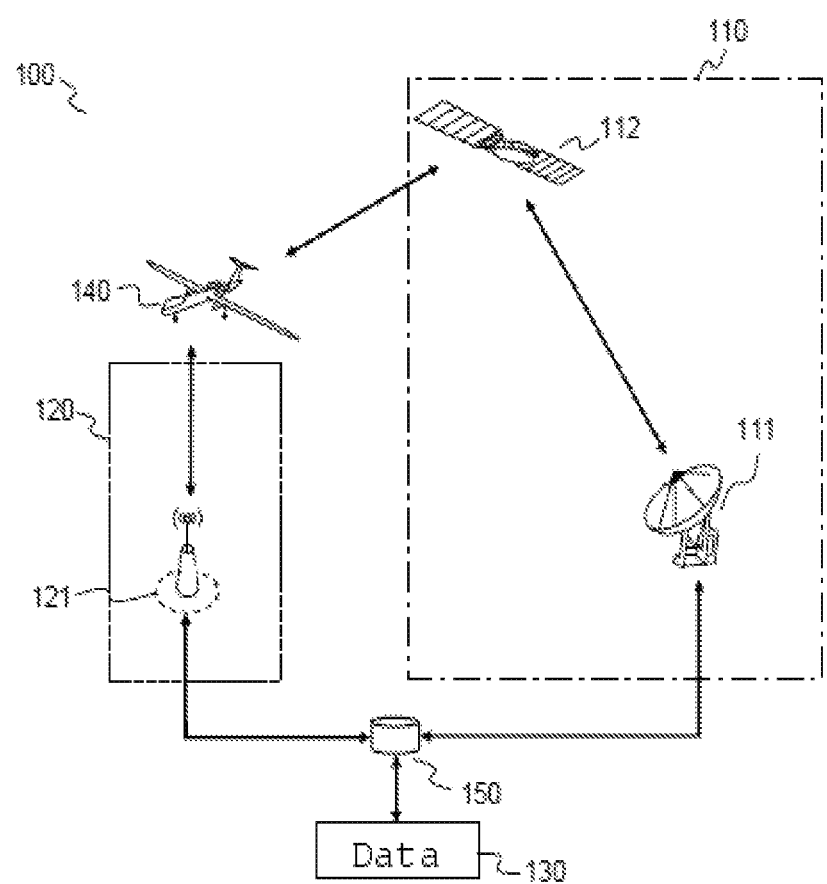
FIG. 1a presents a first embodiment of a communication system according to the invention.

FIG. 1a presents a first embodiment of a communication system 100 allowing the implementation of the method according to the invention. This communication system is composed of a main network in the form of a satellite network 110 comprising a first station 111, the first station being a satellite station, transmitting data by way of a satellite 112, and of a secondary network in the form of a terrestrial network 120 comprising a second station, the second station being a terrestrial station 121. The two networks make it possible to dispatch data 130 bound for a user terminal 140, possessing capabilities for communication on both networks.

The satellite station, the terrestrial station and the user terminal each employ a temporal reference used during the transmission of messages. This temporal reference makes it possible to determine the instants of emission of the messages, by effecting the link between a time slot (such as for example a frame number, a time interval number) and an emission time.

A multi-link gateway 150 makes it possible to effect the link between the satellite network and the terrestrial network.

Figure 1B:
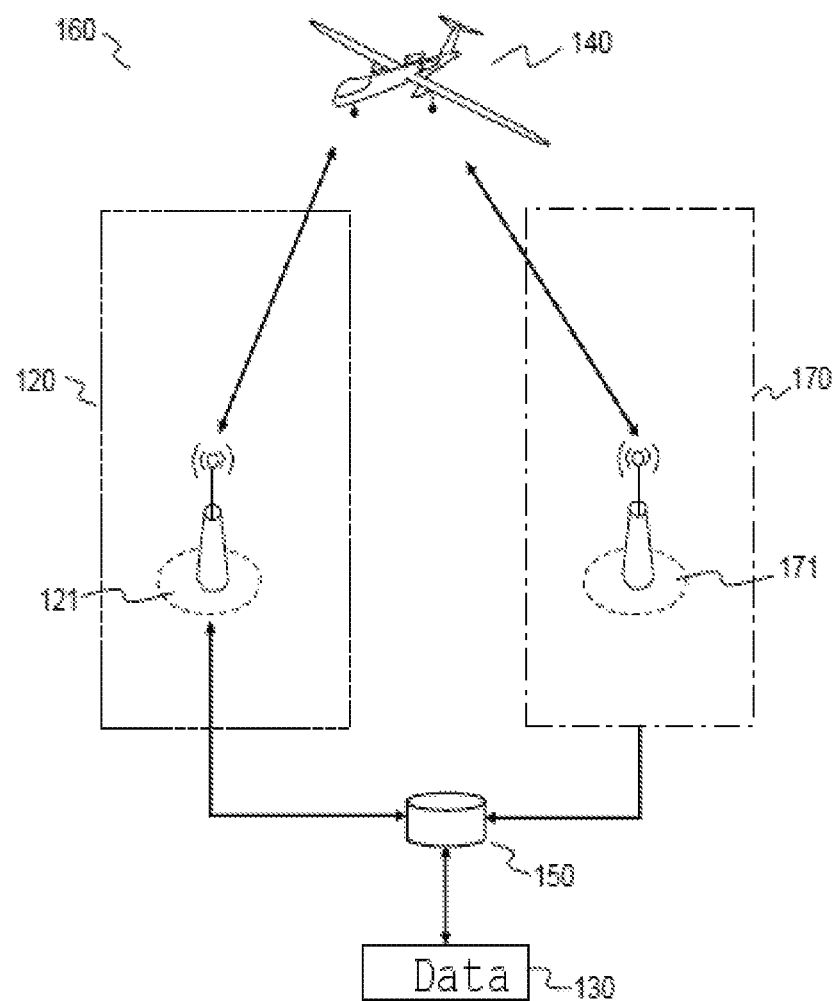
FIG. 1b presents a second embodiment of a communication system according to the invention.

FIG. 1b presents a second embodiment of a communication system 160 allowing the implementation of the method according to the invention, in which the secondary network is a terrestrial network 170 comprising a terrestrial station 171.

The method described here for synchronizing the instants of arrival applies to the two embodiments presented in FIGS. 1a and 1b. The subsequent description refers to the first embodiment of the communication system according to the invention represented in FIG. 1a, but could apply in an identical manner to the second embodiment.

The method also applies in the presence of more than two secondary networks, and of more than two user terminals.

The implementation of a hybrid communication using the terrestrial network and the satellite network and requiring synchronization of the transmission of the signals to a user terminal depends on the position of the user and requires the calculation of a time shift to be applied to the emissions from the terrestrial station. This time shift is varied for each of the user terminals.

Figure 2:
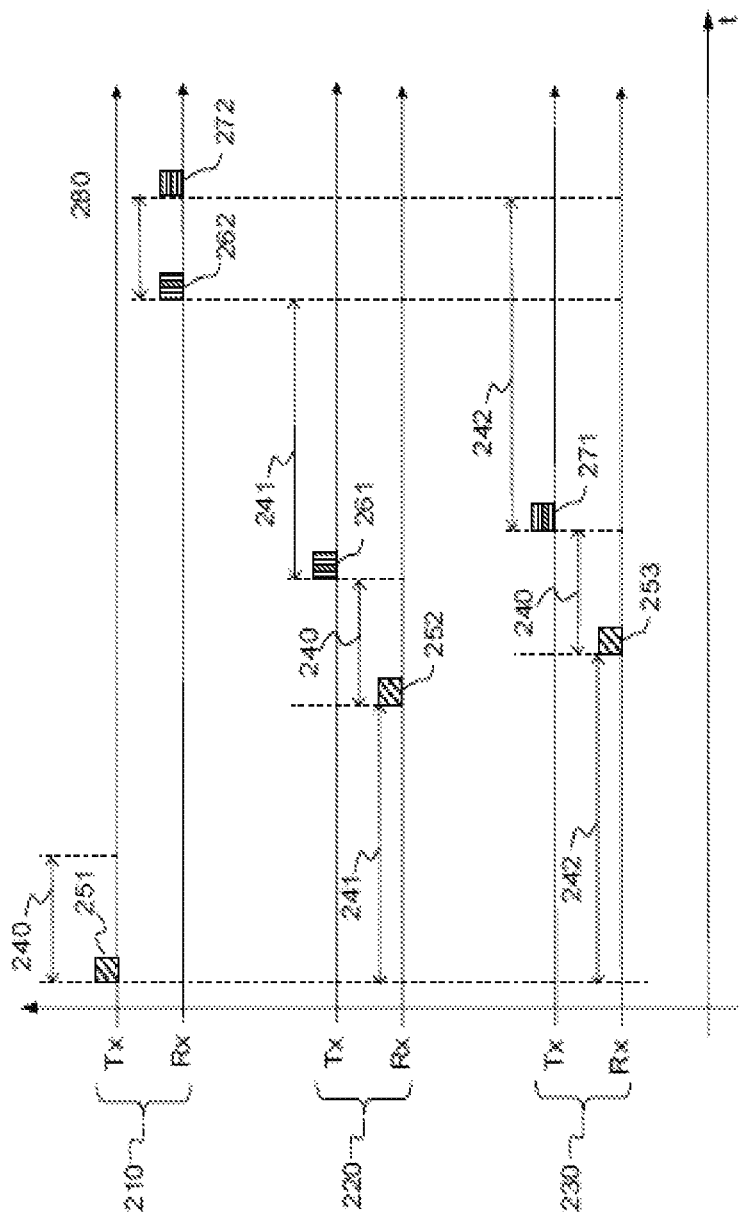
FIG. 2 presents a chart of the temporal succession of the first part of the method according to the invention.

FIG. 2 presents a chart of the temporal succession of the first steps of the method according to the invention, making it possible to calculate a first time interval corresponding to the difference between the transmission time from the satellite station to the user terminal, and the transmission time from the satellite station to the terrestrial station.

The transmission time corresponds to the duration necessary for a message to go from the source to the destination. For the satellite link, this time corresponds to the propagation time from the satellite station to the satellite, to the propagation time from the satellite station to its destination, and to the time necessary for the satellite to carry out the reception and the re-emission of the message.

FIG. 2 presents at 210 the various steps of emission (Tx) and of reception (Rx) of messages from and to the satellite station.

Likewise, it presents at 220 the various steps of emitting and receiving messages from and to the user terminal, and at 230 the various steps of emitting and receiving messages from and to the terrestrial station.

Signals dedicated to the synchronization of the whole of the communication system are transmitted periodically in dedicated time slots, these signals being mutually separated by a fixed time interval 240. This interval may, for example, be linked to the duration of a frame.

The satellite station emits a first synchronization signal 251. This signal is relayed by the satellite, and is received by the user terminal 252 and the terrestrial station 253.

The instants of reception of this synchronization signal depend on the distance separating the satellite station and the user terminal on the one hand, the satellite station and the terrestrial station on the other hand, and therefore on the associated transmission times 241 and 242.

The synchronization signals being transmitted in known time slots, the user terminal and the terrestrial station adjust their temporal references as a function of the instants of reception 252 and 253 of this first synchronization signal. Thus, the following emissions carried out by the user terminal and the terrestrial station will be carried out at instants calculated with respect to the reception of this first synchronization signal.

During the time slot following dedicated to the signalling transmission, i.e. after a duration equivalent to the time interval 240, the user terminal emits a second synchronization signal 261, and the terrestrial station emits a third synchronization signal 271.

Depending on the geographical positioning of the various elements of the communication system, the third synchronization signal 271 sent from the terrestrial station may be emitted before or after the second synchronization signal 261 sent from the user terminal.

The satellite station measures the time difference 280 between the instant of arrival of the second synchronization signal 262 and the instant of arrival of the third synchronization signal 272.

This time difference corresponds to twice the time difference between the time of transmission of the satellite station to the user terminal, and the time of transmission of the satellite station to the terrestrial station, i.e., 2*Satellite Transmission Delay Delta.

The satellite station thereafter calculates a first time interval corresponding to the duration of Satellite Transmission Delay Delta, and transmits it to the terrestrial station. This transmission can be done by way of the data transmitted by the satellite link, or by using the multi-link access gateway.

In order to avoid collisions between the synchronization signals arising from the user terminal, from the satellite station and from the terrestrial station, each item of equipment uses its own emission frequency.

According to another mode of implementation of the method, it is possible to use the same emission frequency for all of the equipment, by temporally staggering the instants of emission of the second and third synchronization signals. Thus, the third synchronization signal can be emitted after a duration equivalent to twice the time interval 240, the time difference between the arrival of the second synchronization signal then being equal to 2*Satellite Transmission Delay Delta+interval 240.

Figure 3:
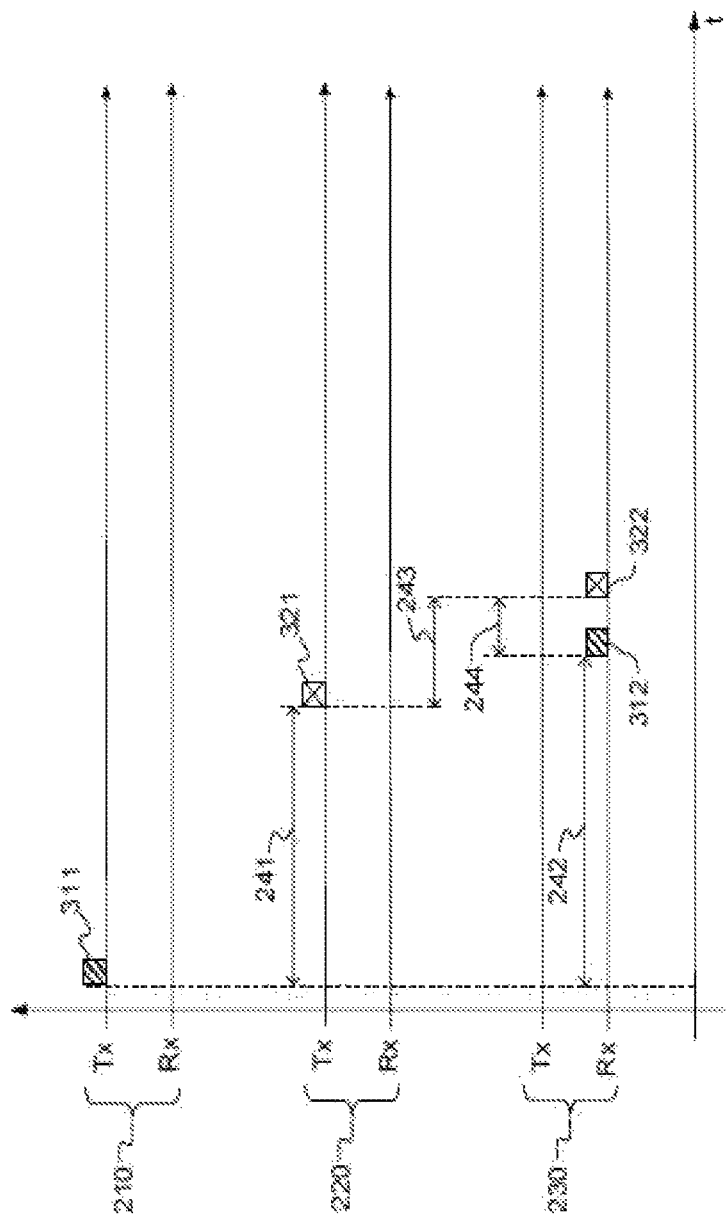
FIG. 3 presents a chart of the temporal succession of the second part of the method according to the invention.

FIG. 3 presents a chart of the temporal succession of the following steps of the method according to the invention, making it possible to calculate a second time interval corresponding to the transmission time between the user terminal and the terrestrial station, and then a third time interval corresponding to a time shift to be applied by the terrestrial station in respect of the transmissions bound for the user terminal.

In FIG. 3, the satellite station emits a fourth synchronization signal 311, which is received at 312 by the terrestrial station, with a delay 242 corresponding to the transmission time between the satellite station and the terrestrial station.

The user terminal emits a fifth synchronization signal 321 during the same time slot as the fourth synchronization signal. The time slot corresponds to a signal emission time expressed in the form of a frame identifier and of an identifier of a time interval inside the frame. The temporal reference of the user terminal, which allows it to associate this time slot with an instant of emission, being positioned with respect to the instant of reception of the first synchronization signal transmitted by the satellite station, the time of emission of the message is shifted by a duration 241 corresponding to the transmission time between the satellite station and the user terminal. The terrestrial station receives the fifth synchronization signal 322 with a delay 243 corresponding to the transmission time between the user terminal and the terrestrial station. The terrestrial station determines a second time interval 244 corresponding to the difference between the instant of reception 312 of the fourth synchronization signal from the satellite station, and the instant of reception 322 of the fifth synchronization signal from the user terminal, called Satellite/Terminal User Delta.

Just as for the transmission of the second and third synchronization messages, and so as to avoid collisions between the synchronization signals, each item of equipment uses its own emission frequency. According to another mode of implementation of the method, it is possible to use the same emission frequency, by temporally staggering the instants of emission of the fourth and fifth synchronization signals. Thus, the fifth synchronization signal can be emitted after a duration equivalent to the time interval 240, this value having to be taken into account for the calculation of the second time interval.

The terrestrial station then calculates a third time interval, the sum of the first time interval and of the second time interval, i.e. Satellite Transmission Delay Delta+Satellite/Terminal User Delta.

This third time interval corresponds to a time shift having to be applied by the terrestrial station to its temporal reference for the emission of the next messages, thus allowing the signals transmitted from the satellite station and the signals transmitted from the terrestrial station to arrive temporally synchronized at the user terminal.

Figure 4:
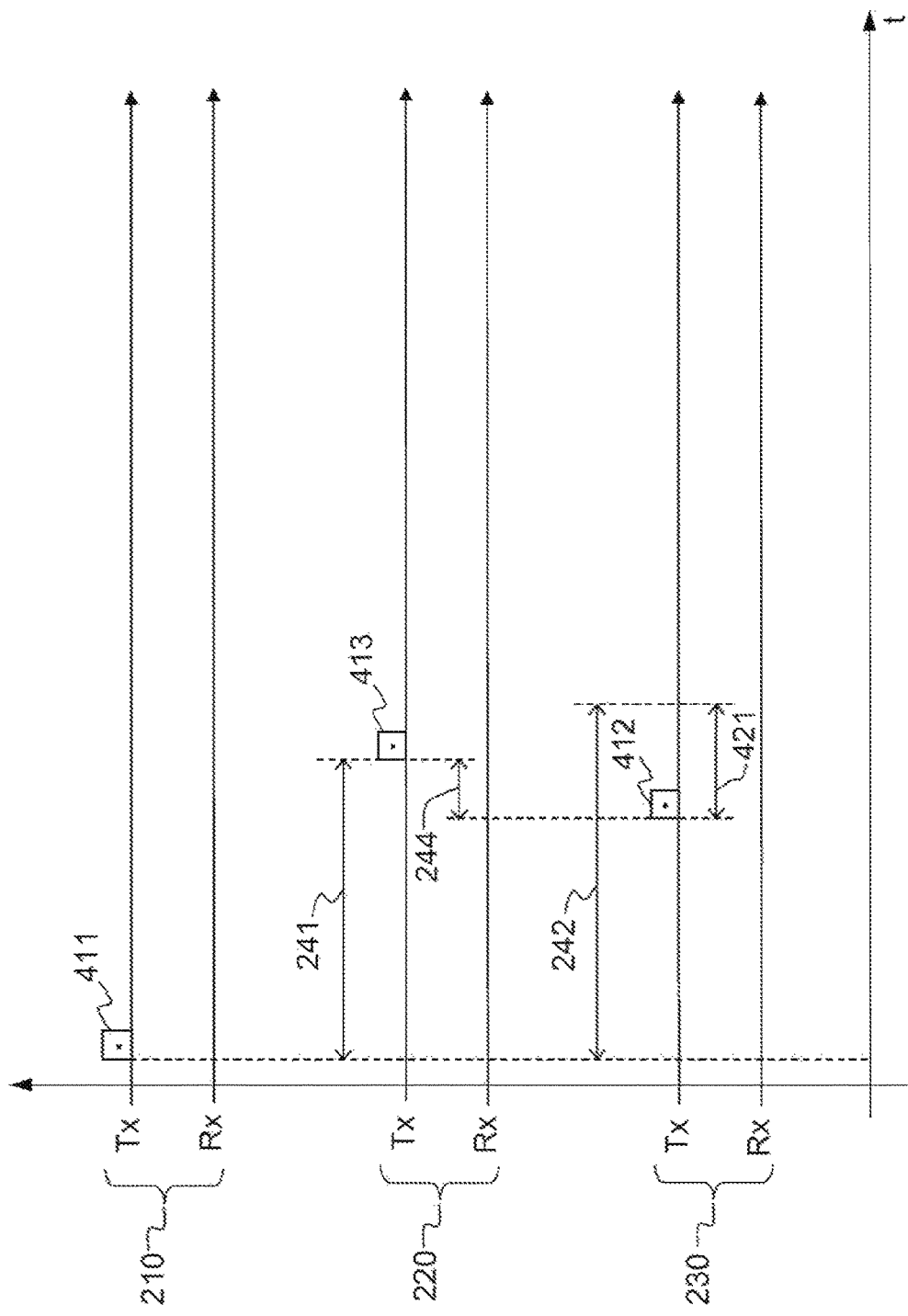
FIG. 4 presents a chart of the temporal succession of the emissions in a communication system synchronized according to the invention.

FIG. 4 presents a chart of the temporal succession of the emissions in a communication system synchronized according to the invention. In FIG. 4, data are intended to be simultaneously transmitted to a user terminal by way of a satellite network and of a terrestrial network.

The data 411 are emitted by the satellite station, at a predetermined time slot.

The ground station is programmed to also emit the same data 412 during the same time slot according to its own temporal reference, shifted by a duration equal to the value of the third interval.

By construction, the temporal reference of the terrestrial station and the temporal reference of the satellite station are shifted by an interval 242 corresponding to the transmission time between the two stations. The emission of the data is therefore carried out with a shift corresponding to the interval 242, less a duration 421 corresponding to the third time interval calculated previously.

The data 411 emitted from the satellite station reach the user terminal after a time 241 corresponding to the transmission time between these two items of equipment.

The data 412 emitted from the terrestrial station reach the user terminal after a duration 244 corresponding to the transmission time between these two items of equipment.

In the synchronized system such as described in the invention, the data 411 and 412 reach the user terminal at the same moment 413, thereby making it possible to use temporally constrained access networks using alternatively one or the other of the networks, or to transmit simultaneously from the two networks by using waveforms whose tolerance to multipaths is limited.

The method described is intended to be implemented on real-time calculation devices distributed between a satellite station 111, a terrestrial station 121 and a user terminal 140. These devices can be diverse hardware elements and/or software elements, such as for example computer programs or dedicated electronic circuits.

The method can be executed by a reprogrammable calculation machine (a processor or a micro controller for example) executing a program comprising a sequence of instructions, or by a dedicated calculation machine (for example a set of logic gates such as an FPGA or an ASIC, or any other hardware module).

Figure 5:
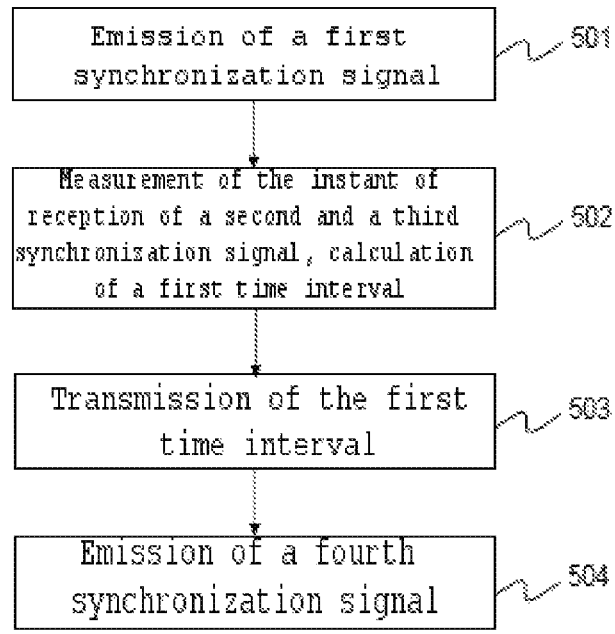
FIG. 5 illustrates the steps of the method according to the invention which are implemented by the main network.

FIG. 5 illustrates the steps of the method according to the invention which are implemented by the main network, or satellite network.

The implementation of the method on the satellite station comprises:

A step 501 of emitting a first synchronization signal 251, to the terrestrial station and the user terminal, A step 502 of measuring the instant of reception of a second synchronization signal 262, the second synchronization signal being transmitted by the terrestrial station subsequent to the reception of the first synchronization signal, of measuring the instant of reception of a third synchronization signal 272, the third synchronization signal being transmitted by the terrestrial station subsequent to the reception of the first synchronization signal, and of calculating a first time interval, on the basis of the two measured reception instants, A step 503 of transmitting this first time interval bound for the terrestrial station, and A step 504 of emitting a fourth synchronization signal 311. This fourth signal is transmitted at a predefined instant, in the same time slot as the synchronization signal 321 transmitted by the user terminal.

Figure 6:
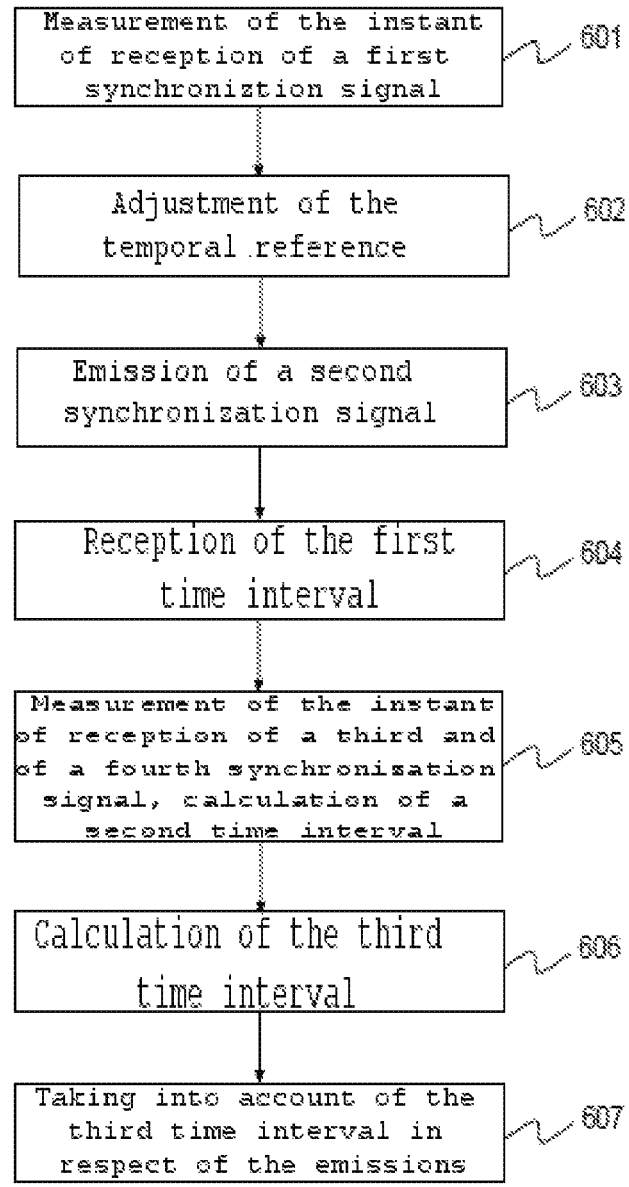
FIG. 6 illustrates the steps of the method according to the invention which are implemented by the secondary network.

FIG. 6 illustrates the steps of the method according to the invention which are implemented by the secondary network, or terrestrial network.

The implementation of the method on the terrestrial station comprises:

A step 601 of measuring the instant of reception of a first synchronization signal 253, the first synchronization signal being transmitted by the satellite station, A step 602 of updating the temporal reference, or emission time, of the terrestrial station, A step 603 of emitting a second synchronization signal 271, to the satellite station, A step 604 of receiving the first time interval transmitted by the satellite station, A step 605 of measuring the instant of reception of a third synchronization signal 312, the third synchronization signal being transmitted by the satellite station, of measuring the instant of reception of a fourth synchronization signal 322, the fourth synchronization signal being transmitted by the user terminal, and of calculating a second time interval 244, on the basis of the two measured reception instants, A step 606 of calculating a third time interval, on the basis of the first time interval received during step 604, and of the second time interval calculated during step 605, and An iterative step 607 of taking into account a shift of a duration equal to the third time interval, upon the emission of future messages bound for the user terminal.

Figure 7:
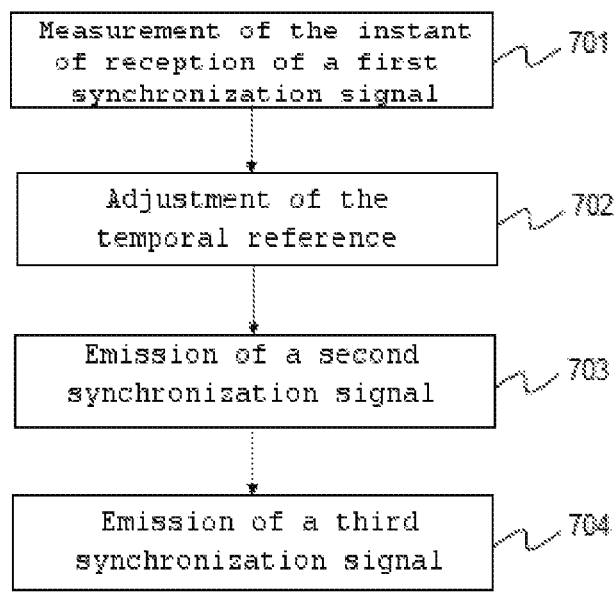
FIG. 7 illustrates the steps of the method according to the invention which are implemented by the user terminal.

FIG. 7 illustrates the steps of the method according to the invention which are implemented by the user terminal.

The implementation of the method on the user terminal comprises:

A step 701 of measuring the instant of reception of a first synchronization signal 252, the first synchronization signal being transmitted by the satellite station, A step 702 of updating the temporal reference, or emission time, of the user terminal, A step 703 of emitting a second synchronization signal 261 to the terrestrial station, and A step 704 of emitting a third synchronization signal 321. This third signal is transmitted at a predefined instant, in the same time slot as the synchronization signal 311 emitted by the satellite station, and described in step 504.

The transmission system presented in FIG. 1a exhibits a multi-link gateway 150. This gateway, which does not intervene in the synchronization method, is responsible for receiving the data packets from the outside network, and for transmitting them to the satellite station and to the terrestrial station.

This gateway manages the sequencing of the packets to be sent on each network. In particular, it transmits the packets associated with an emission time to the various stations of the communication system, the emission time being able to correspond to a frame number and time slot number at which the transmission must take place.

The solution afforded therefore makes it possible to slave the temporal reference of transmission of a terrestrial station to a reference synchronization signal broadcast by a satellite station in such a way that the signals transmitted by the terrestrial station and by the satellite station are received in a synchronous manner at the level of the receiver of the satellite/terrestrial hybrid user terminal.

The invention makes it possible for example to use access modes of TDMA or WCDMA type without risk of interference between the signals transmitted from each of the networks. It also makes it possible to transmit signals simultaneously from a terrestrial station and a satellite station, thereby making it possible to afford, for identical powers received, a theoretical gain in spatial diversity of 3 dB in the link budget.

Furthermore as the two access systems transmit to the user terminal simultaneously, the failure or the temporary unavailability of one of the access systems does not result in a loss of the service but just in a degradation of the reception conditions. The proposed architecture therefore improves the availability and the continuity of the service, with respect to a conventional architecture using a single access network.

The invention claimed is:

1. A method for synchronizing the transmission of messages in a communication system including a user terminal, a main communication network to the user terminal having a first station, and a secondary communication network to the user terminal having a second station, the first station, the second station and the user terminal each having a temporal reference, the method comprising:

emission, by the first station, of a first synchronization signal to the second station and the user terminal, measurement, by the second station and the user terminal, of the instants of reception of the first synchronization signal, adjustment of the temporal references of the second station and of the user terminal, on the basis of the instants of reception of the first synchronization signal, emission, by the user terminal, of a second synchronization signal to the first station, emission, by the second station, of a third synchronization signal to the first station, measurement, by the first station, of the instant of reception of the second synchronization signal and of the instant of reception of the third synchronization signal, and calculation of a first time interval on the basis of the instants of reception of the second and the third synchronization signals, transmission, by the first station, of the first calculated time interval to the second station, emission, by the first station, of a fourth synchronization signal to the second station, emission, by the user terminal, of a fifth synchronization signal to the second station, measurement, by the second station, of the instant of reception of the fourth synchronization signal and of the instant of reception of the fifth synchronization signal, and calculation of a second time interval on the basis of the instants of reception of the fourth and the fifth synchronization signals, calculation, by the second station, of a third time interval on the basis of the first time interval and of the second time interval, and upon the emission of data by the second station bound for the user terminal, shifting of the instants of emission by a duration equal to the third time interval.

2. The method of synchronization according to claim 1, wherein the fourth and the fifth synchronization signals are transmitted in one and the same time slot, the time slot designating an instant of emission with respect to at least one of the temporal references.

3. The method of synchronization according to claim 1, wherein the first time interval represents a difference between the time of transmission of the user terminal to the first station and the time of transmission of the second station to the first station.

4. The method of synchronization according to claim 1, wherein the second time interval represents a difference between the instant of arrival of the fourth synchronization signal transmitted by the first station and the instant of arrival of the fifth synchronization signal transmitted by the user terminal.

5. The method of synchronization according to claim 1, wherein the third time interval represents a time shift to be applied in respect of the emissions of the second station, the time interval being obtained by summation between the first time interval and the second time interval.

6. A communication system comprising a user terminal, a main communication network to the user terminal comprising a first station, and a secondary communication network to the user terminal comprising a second station, wherein the first station, the said second station, and the user terminal are configured to implement the method of claim 1, for synchronizing the transmission of messages.

7. The communication system according to claim 6 further comprising a multi-link gateway responsible for dispatching data to the first station and the second station.

8. The communication system according to claim 7 wherein the first time interval is transmitted by the first station to the second station by way of the multi-link gateway.

9. The communication system according to claim 6, wherein the main communication network is a satellite network and the secondary communication network is a terrestrial network.

* * * * *